May 18, 1937.  A. P. WITHALL  2,080,590

HANDWHEEL FOR BRAKES

Filed July 22, 1935

Inventor
Albert P. Withall
By Henry Fuchs
Atty.

Patented May 18, 1937

2,080,590

UNITED STATES PATENT OFFICE 2,080,590

HANDWHEEL FOR BRAKES

Albert P. Withall, Chicago, Ill., assignor to W. H. Miner, Inc., Chicago, Ill., a corporation of Delaware Application July 22, 1935, Serial No. 32,470

7 Claims. (Cl. 74—552)

This invention relates to improvements in hand wheels for brakes.

One object of the invention is to provide a hand wheel for operating the rotary actuating member of brakes for railway cars, wherein the hand wheel is so designed as to provide hand grip portions so located as to give the maximum leverage in tightening the brakes and at the same time assure the brakeman's obtaining a firm grip, thereby preventing slipping of his hand inwardly toward the axis of rotation of the wheel, with resultant loss of power due to the effective shortening of the lever arm.

Another object of the invention is to provide an operating hand wheel for brakes having arms extending outwardly away from the hub section of the wheel, and serving as lever means for rotating the wheel, wherein said arms are so arranged and designed that grip means is provided thereon at the periphery of the wheel to thereby obtain full advantage of the maximum effective length of the lever arms, thus securing the maximum amount of power for a given diameter of hand wheel.

Still another object of the invention is to provide a hand wheel of the character set forth including; a hub portion, spokes outwardly projecting from said hub portion, and a rim member which is interrupted at spaced intervals to permit gripping of the spokes by the operator to the greatest possible advantage to obtain the maximum leverage for a given diameter of hand wheel.

A more specific object of the invention is to provide an operating wheel for railway car hand brake mechanisms comprising spokes arranged in a plurality of pairs and extending outwardly from the central portion of the wheel to the periphery thereof, the spokes of each pair being connected by a rim section extending between said spokes only, and the wheel being rimless between adjacent pairs of spokes, thereby providing reentrant openings at the periphery of the wheel to permit gripping of alternate spokes at the outermost portions thereof, whereby the brakeman may take full advantage of the leverage provided and exert a direct pulling force on each of said alternate spokes.

Yet another object of the invention is to provide a hand wheel as specified in the preceding paragraph, wherein three distinct hand grips are presented by the arms of each pair of spokes together with the connecting rim section thereof, each spoke forming a distinct hand grip and the rim section forming the third hand grip.

Other objects of the invention will more clearly appear from the description and claims hereinafter following.

Figure 1:
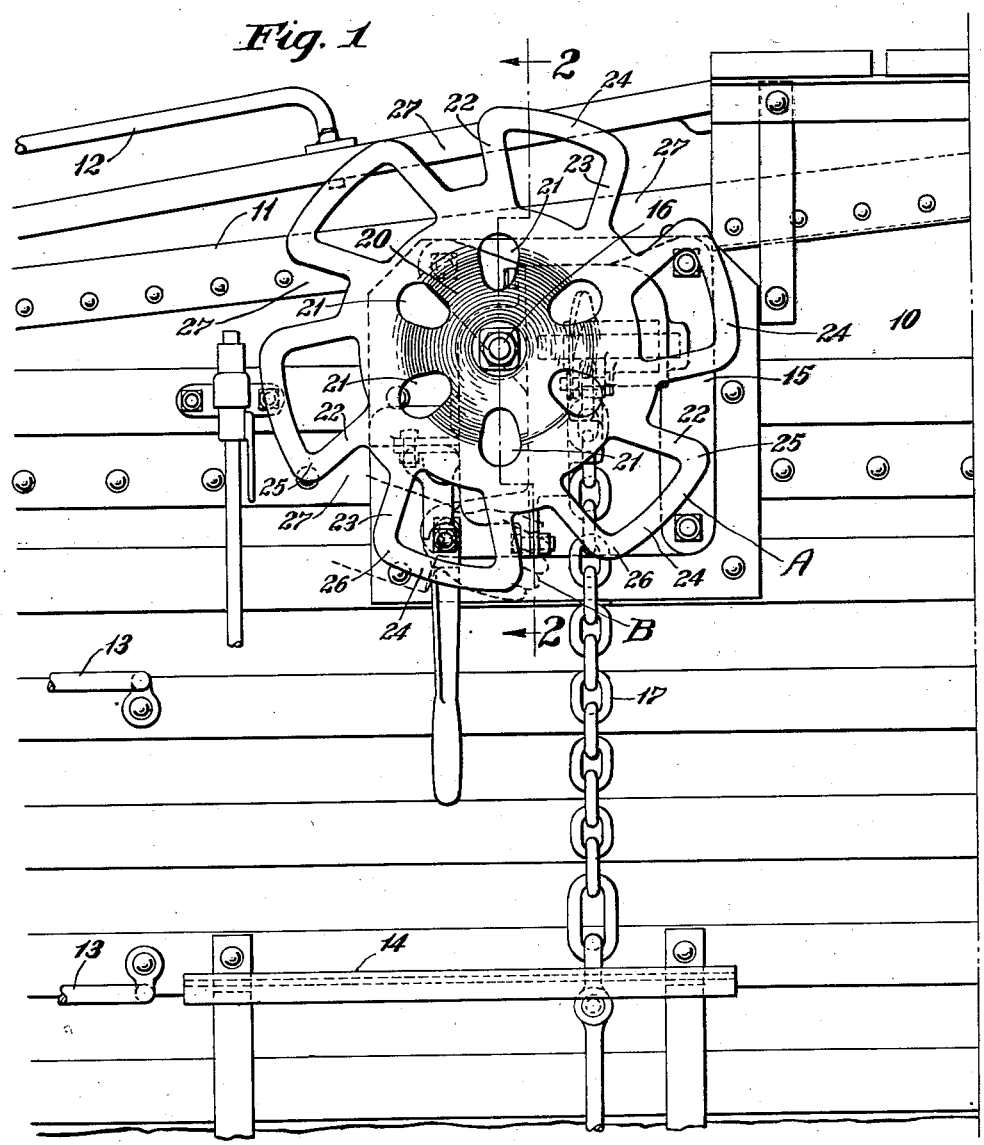
Figure 2:
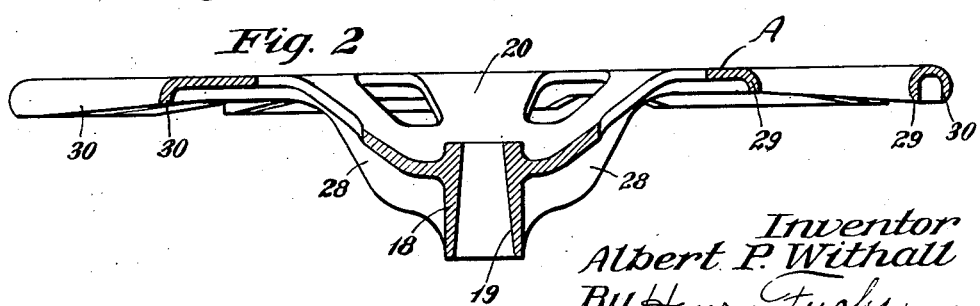

In the drawing forming a part of this specification, Figure 1 is an end elevational view of a portion of a railway car, showing a hand brake mechanism mounted on the end wall of the same, and illustrating my improved hand wheel in connection therewith. Figure 2 is a vertical, sectional view through my improved hand wheel, on an enlarged scale, corresponding substantially to the line 2—2 of Figure 1.

In said drawing 10 designates the vertical end wall of a railway car, 11 the roof member of the car, 12 the usual grab iron on the roof, 13 the brakeman's ladder, which is fixed to said end wall, and 14 the brakeman's platform. The operating parts of the hand brake mechanism are contained in a housing 15 fixed to the wall 10 of the car, the operating mechanism being of any well-known type, wherein a chain winding member is actuated through rotation of a hand wheel fixed to a rotary actuating member 16, operatively connected to the winding member. In the type of brakes illustrated, the axis of the rotary actuating member 16 is arranged horizontally and normal to the end wall of the car. The brake chain, which is indicated by 17, has its opposite ends connected respectively to the winding member and the brake mechanism proper of the car, not shown. The chain is wound on the winding member in a well-known manner in order to apply the brakes.

In carrying out my invention, I provide a hand wheel A, which is fixed to the rotary actuating member 16, which is preferably in the form of a shaft. The hand wheel A is rotated in a clockwise direction, as viewed in Figure 1, to apply or tighten the brakes, and in a reverse direction to back up or ease off the same. The hand wheel A has a hub member 18 provided with a tapering opening 19 of angular cross section adapted to receive the correspondingly formed outer end portion of the shaft or member 16. As shown in Figure 1, the hand wheel is fixed in position on the shaft 16 by the usual nut threaded on the outer end thereof. The central portion of the wheel A is in the form of an inwardly dished section 20 formed integral with the hub portion 18. The dished central section 20 may be either solid or provided with a plurality of openings 21—21 to reduce the weight of the wheel. Outwardly extending from the central section 20 are a plurality of spokes which are arranged in pairs, the spokes of each pair being respectively designated by 22 and 23. As most clearly shown in Figure 1, there are preferably six pairs of spokes 22—23 and the spokes of each pair are connected by a curved rim section 24, which extends continuously between said spokes. The outer end of each spoke is curved laterally, as shown in Figure 1, and merges with the corresponding end of the rim section, said curved portions of the spokes 22 and 23 being indicated respectively by 25 and 26.

The wheel A is rimless between adjacent pairs of spokes, thereby providing reentrant peripheral openings 27—27 giving sufficient clearance between said adjacent pairs of arms to permit of the brakeman placing his hand in engagement with the spoke 22 of any of said pairs, as shown in dotted lines B, Figure 1. The hand wheel A thus presents an interrupted rim, the spaced sections 24 of which connect the spokes of said pairs 22—23.

As most clearly shown in Figure 1, the openings between the arms 22—23 of each pair are extended further inwardly of the central section 20 of the wheel than the openings 27, whereby a material reduction in weight of the wheel is effected. The wheel is preferably reenforced by inner ribs or webs 28—28 which extend outwardly from the hub 18 and merge with reenforcing flanges 29, formed on bounding edge walls of the openings between the pairs of spokes 22—23. The outer side edges of the spokes 22—23 of each pair, the outer edge of the connecting rim section 24, and the outer edge of the central section 20 between adjacent pairs of arms 22—23 are also reenforced by a continuous flange member 30. As will be clear upon reference to Figure 1, the spokes 22 and 23, which project outwardly from the central portion of the wheel, extend in directions which are tangent to circles concentric with the axis of rotation of the hand wheel, thereby giving said spokes an outward inclination which affords a more positive grip for the brakeman's hand. Each pair of arms 22—23, together with the connecting rim section 24, affords a choice of three different hand grips for the brakeman, as he may grip either the arm 22, the arm 23, or the rim section 24. However, the preferred hand grip is provided by each arm 22 and its curved section 25, the brakeman thus being enabled to place his hand, as shown in dotted lines at B in Figure 1, and obtain the maximum leverage provided by the diameter of the wheel.

As will be evident, each spoke 22, together with its curved connecting section 25, forms a lever arm extending to the periphery of the wheel, thus making available the full length of the arm which is an important consideration in obtaining a maximum of power multiplication. The use of the spokes 22 as lever arms acting in this capacity is made possible by the clearance provided between the adjacent pairs of arms 22—23 by the interrupted construction of the rim of the wheel.

I have herein shown and described what I now consider the preferred manner of carrying out my invention, but the same is merely illustrative and I contemplate all changes and modifications that come within the scope of the claims appended hereto.

I claim:

1. In a hand wheel for railway car brakes, the combination with a hub member adapted to be secured to the rotary member of the brake mechanism; of a plurality of pairs of spokes extending outwardly from said hub section; and a rim section connecting the outer ends of each pair of spokes, said wheel being rimless between adjacent pairs of spokes.

2. In a hand wheel for brakes, the combination with a central section including a hub member; of a plurality of pairs of spokes extending outwardly from said central section to the periphery of the wheel; and a curved rim section extending between the spokes of each pair and connecting the outer ends of said spokes, said wheel being rimless between adjacent pairs of spokes.

3. In a hand wheel for brakes, the combination with a central section including a hub member; of a plurality of pairs of spokes extending outwardly from said central section, each spoke serving as a hand grip; and spaced curved rim sections on said wheel, each rim section forming a hand grip and connecting the outer end portions of a pair of spokes, said wheel being rimless between adjacent pairs of spokes.

4. In a hand wheel for brakes, the combination with pairs of spokes projecting outwardly from the central portion of said wheel; of spaced rim sections concentric with the axis of rotation of said wheel, one of said rim sections being disposed between the members of each pair of spokes, the outer ends of said pair of spokes including curved sections merging with said rim section, one of said spokes of each pair together with its curved outer end section forming a continuous lever arm extending to the periphery of the wheel, said wheel being rimless between adjacent pairs of spokes.

5. In a hand wheel for brakes, the combination with a central inwardly dished section; of a hub member on said dished section; a plurality of pairs of spokes projecting outwardly from said dished section; and a rim section connecting the outer ends of the members of each pair of spokes, said wheel being rimless between adjacent pairs of spokes.

6. In a hand wheel for brakes, the combination with a central inwardly dished portion; of spokes projecting outwardly from said dished portion; and an interrupted rim comprising a plurality of separate sections connecting the outer ends of said spokes in pairs only, one spoke of each pair extending tangentially to a circle concentric with the axis of rotation of the wheel.

7. In a hand wheel for brakes, the combination with a central inwardly dished portion; of spokes projecting outwardly from said dished portion; and an interrupted rim comprising a plurality of separate sections connecting the outer ends of said spokes in pairs only, one spoke of each pair extending tangentially to a circle concentric with the axis of rotation of the wheel, and the other spoke of each pair extending tangentially to another circle concentric with said axis of rotation.

ALBERT P. WITHALL.